United States Patent
Fujimoto et al.

(10) Patent No.: US 12,531,458 B2
(45) Date of Patent: Jan. 20, 2026

(54) MOTOR DRIVE DEVICE

(71) Applicant: Hitachi Astemo, Ltd., Hitachinaka (JP)

(72) Inventors: Masao Fujimoto, Hitachinaka (JP); Yuuichi Yanagisawa, Hitachinaka (JP); Akira Ishii, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 410 days.

(21) Appl. No.: 18/041,776

(22) PCT Filed: May 27, 2021

(86) PCT No.: PCT/JP2021/020186
§ 371 (c)(1),
(2) Date: Feb. 15, 2023

(87) PCT Pub. No.: WO2022/097319
PCT Pub. Date: May 12, 2022

(65) Prior Publication Data
US 2023/0299647 A1    Sep. 21, 2023

(30) Foreign Application Priority Data
Nov. 6, 2020   (JP) .................. 2020-185490

(51) Int. Cl.
*H02K 11/25* (2016.01)
*H02K 11/30* (2016.01)
*H02K 11/33* (2016.01)

(52) U.S. Cl.
CPC ............ *H02K 11/25* (2016.01); *H02K 11/30* (2016.01); *H02K 11/33* (2016.01)

(58) Field of Classification Search
CPC ........ H02K 11/33; H02K 11/30; H02K 11/20; H02K 11/25; H02K 11/26; H02K 11/27;
(Continued)

(56) References Cited

U.S. PATENT DOCUMENTS

2002/0105239 A1* 8/2002 Witzig .................. H02K 11/20
                                                              310/68 B
2011/0080140 A1   4/2011 Hogari et al.
(Continued)

FOREIGN PATENT DOCUMENTS

JP            6124939 U    2/1986
JP            S6144753 U   3/1986
(Continued)

OTHER PUBLICATIONS

International Search Report dated Jul. 20, 2021 issued in International Application No. PCT/JP2021/020186, with English translation, 7 pages.
(Continued)

Primary Examiner — Alexander A Singh
(74) Attorney, Agent, or Firm — FOLEY & LARDNER LLP

(57) ABSTRACT

A stator (1B) has stator coils (U1, V1 and W1) of a first system and stator coils (U2, V2 and W2) of a second system, and the coils are supplied with power from inverter modules (21). A fuse module (22) has two fuse circuit elements (32) corresponding to respective systems. Phase lines of U, V and W of each fuse circuit element (32) are connected together at a neutral point (40), and a fuse (38) is interposed between the neutral point (40) and each coil. By supplying power to a heater (39) accommodated in the fuse circuit element (32) from a control terminal (34), the fuse (38) is blown out.

5 Claims, 12 Drawing Sheets

(58) Field of Classification Search
CPC .... H02M 7/003; H02M 7/5387; H02M 1/008; H02P 25/16; H02P 29/024; H02P 2209/03
USPC .............................................. 310/68 R, 68 C
See application file for complete search history.

(56) References Cited

U.S. PATENT DOCUMENTS

2019/0214810 A1* 7/2019 Douglass .............. H02P 29/024
2020/0212767 A1 7/2020 Yatsugi et al.

FOREIGN PATENT DOCUMENTS

| JP | H566013 A | 3/1993 |
| JP | H09-298786 A | 11/1997 |
| JP | 2001-200790 A | 7/2001 |
| JP | 2002-084631 A | 3/2002 |
| JP | 3166794 U | 3/2011 |
| JP | 2011-223788 A | 11/2011 |
| JP | 2014-014440 A | 1/2014 |
| JP | 2015-202046 A | 11/2015 |
| JP | 2017-143082 A | 8/2017 |
| JP | 2019-022414 A | 2/2019 |
| JP | 2019-062686 A | 4/2019 |

OTHER PUBLICATIONS

Microfilm of the specification and drawings annexed to the request of Japanese Utility Model Application No. 78983/1988 (Laid-open No. 3137/1990) (Toshiba Netsukigu KK) Jan. 10, 1990, claims, specification, p. 7, line 19 to p. 11, line 8, fig. 1, 8.
Written Opinion dated Jul. 20, 2021 issued in International Application No. PCT/JP2021/020186, with English translation, 14 pages.

* cited by examiner

MOTOR DRIVE DEVICE

TECHNICAL FIELD

The present invention relates to a motor drive device that is structured integrally with an electric motor having a coil for each phase and drives and controls the electric motor.

BACKGROUND ART

Patent Document 1 discloses so-called electrically mechanically integrated actuator in which the electric motor and the motor drive device driving and controlling the electric motor are structured integrally with each other. In Patent Document 1, as the electric motor, a three-phase motor in which three coils are Y-connected is used, and a configuration in which neutral point relays configured by respective switching elements are provided between the coil of each phase and a neutral point for fail-safe is disclosed.

Further, Patent Document 2 discloses a motor drive device having a configuration in which fuse patterns are arranged between respective upper and lower arms of an inverter circuit that drives a three-phase motor, and when a short circuit occurs at either the upper arm or the lower arm, current is cut off by its overcurrent.

In a case of the conventional having the neutral point relays configured by the respective switching elements as in Patent Document 1, there is still room for improvement in terms of cost due to usage of the switching element and a decrease in efficiency due to the switching element acting as a resistance (a resistor).

Further, since the fuse patterns are arranged close to switching elements that form respective upper and lower arms, a cut-off temperature of the fuse is susceptible to an operating temperature of the switching element, then reliability of cut-off operation is decreased. In addition, in a case of the mere fuse pattern, the circuit cannot be cut off by an external cut-off signal.

CITATION LIST

Patent Document

Patent Document 1: Japanese Unexamined Patent Application Publication No. 2019-022414
Patent Document 2: Japanese Unexamined Patent Application Publication No. 2019-062686

SUMMARY OF THE INVENTION

As one aspect of the present invention, a motor drive device which is structured integrally with an electric motor having a coil for each phase and drives and controls the electric motor, and which is configured so that a phase line of each phase including the coil for each phase is connected at a neutral point, the motor drive device comprises: a fuse circuit arranged between the coil of the phase line and the neutral point and configured to be able to cut off power supplied to the neutral point in response to a cut-off signal from a control circuit.

According to the present invention, by using the fuse circuit instead of the neutral point relay configured by the switching element, it is possible to achieve the fail-safe at a low cost and improve efficiency by lowering of a resistance.

EMBODIMENTS FOR CARRYING OUT THE INVENTION

Embodiments in which the present invention is applied to, for instance, an electric actuator device of an electric power steering device of a vehicle will be described in detail below with reference to the drawings.

Figure 1:
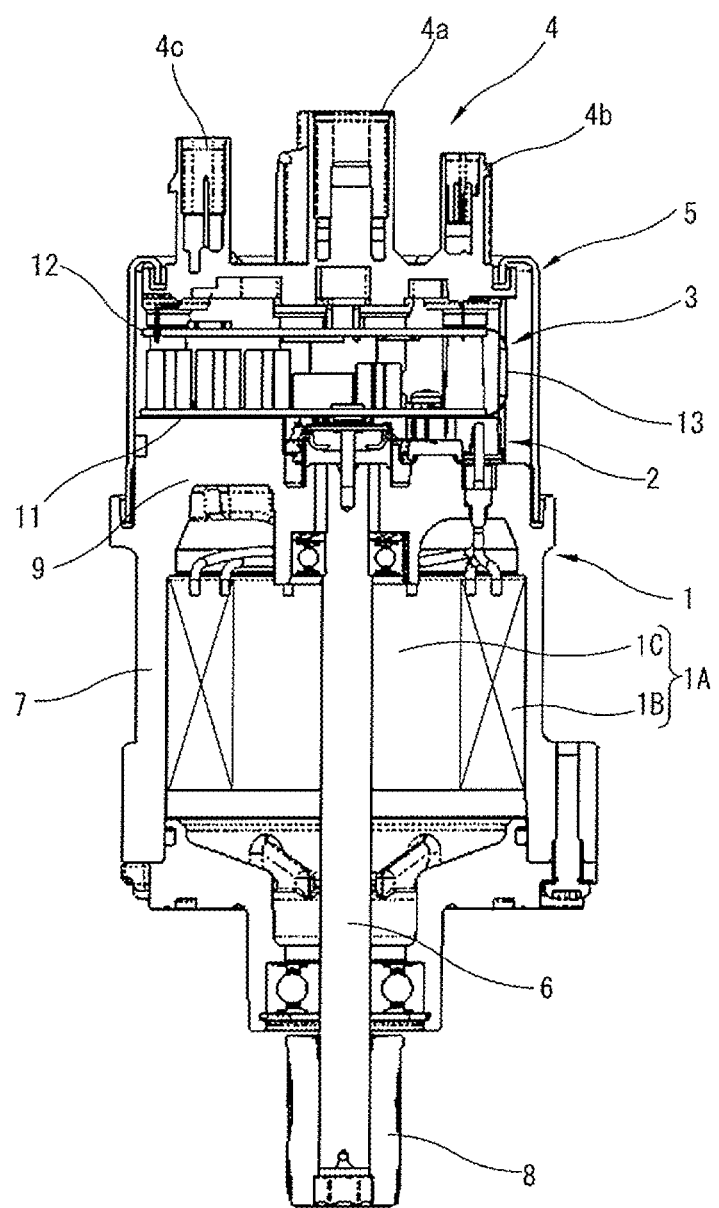
FIG. 1 is a sectional view of an electric actuator device for a power steering device, having a motor drive device according to the present invention.

FIG. 1 is a sectional view of the electric actuator device that provides a steering assist force to a steering mechanism (not shown) of the electric power steering device. This electric actuator device has a cylindrical motor unit 1, an inverter/power module unit 2, a circuit board 3 formed by a foldable multilayer wiring board, a connector member 4 where a plurality of connectors are integrated and a motor cover 5 fixed to one end portion of the motor unit 1 so as to cover or accommodate therein the inverter/power module unit 2, the circuit board 3 and the connector member 4. A motor drive device in claims is mainly formed by the inverter/power module unit 2 and the circuit board 3.

The motor unit 1 is a unit configured such that a motor 1A having a stator 1B and a rotor 1C is accommodated in a cylindrical housing 7. The motor unit 1 has a connecting portion 8 such as a gear or a spline at a top end of a rotation shaft 6 that protrudes from a top end surface of the housing 7, and is connected to the steering mechanism (not shown) through this connecting portion 8. The motor 1A is a three-phase permanent-magnet-type brushless motor. The stator 1B has three-phase coils of U-phase, V-phase and W-phase, and permanent magnets are arranged on an outer circumferential surface of the rotor 1C.

Here, in order to secure redundancy, the motor 1A has a dual coil and corresponding permanent magnets. That is, the motor 1A has a set of coils of U-phase, V-phase and W-phase and corresponding permanent magnets for a first system and a set of coils of U-phase, V-phase and W-phase and corresponding permanent magnets for a second system.

One end portion of the housing 7, which is an opposite side to the connecting portion 8, is formed as a bottom wall portion 9 having a horseshoe shape and covering end surfaces of the stator 1B and the rotor 1C. The motor cover 5 having an outline of a horseshoe shape corresponding to the bottom wall portion 9 is fixed to the housing 7 so as to cover this bottom wall portion 9. Then, the inverter/power module unit 2, the circuit board 3 and the connector member 4 are accommodated in a space formed between the bottom wall portion 9 and the motor cover 5 with these inverter/power module unit 2, circuit board 3 and connector member 4 stacked in an axial direction of the rotation shaft 6.

The connector member 4 has three connectors that extend in a same direction along the axial direction of the rotation shaft 6. More specifically, the connector member 4 has a power connector 4a located at the middle of the connector member 4, a sensor input connector 4b inputting signals from sensors (e.g. a steering angle sensor and a torque sensor) located at a steering mechanism side and a communication connector 4c to communicate with the other control devices in the vehicle (e.g. by CAN communication). These connectors 4a, 4b and 4c protrude to the outside through an opening of the motor cover 5.

The circuit board 3 is set in a substantially U-shaped folded state between the bottom wall portion 9 and the connector member 4. That is, the circuit board 3 has a first rigid section 11 as a power-related board where a group of electronic components through which relatively large current passes for drive of the motor 1A through the inverter/power module unit 2 is mounted, a second rigid section 12 as a control-related board where control-related electronic components through which relatively small current passes are mounted, and a flexible section 13 located between the first and second rigid sections 11 and 12. The circuit board 3 is then accommodated between the housing 7 and the motor cover 5 which serve as a case or an enclosure with the flexible section 13 being bent (or deformed) such that the first and second rigid sections 11 and 12 overlapping or stacking in the axial direction of the rotation shaft 6. The first rigid section 11 and the second rigid section 12 in the folded state are supported such that each flat surface state of the first rigid section 11 and the second rigid section 12 is maintained and these flat surfaces are arranged parallel to each other while securing a distance between the first rigid section 11 and the second rigid section 12 to the extent that the electronic components mounted on the first and second rigid sections 11 and 12 do not interfere with each other.

Figure 2:
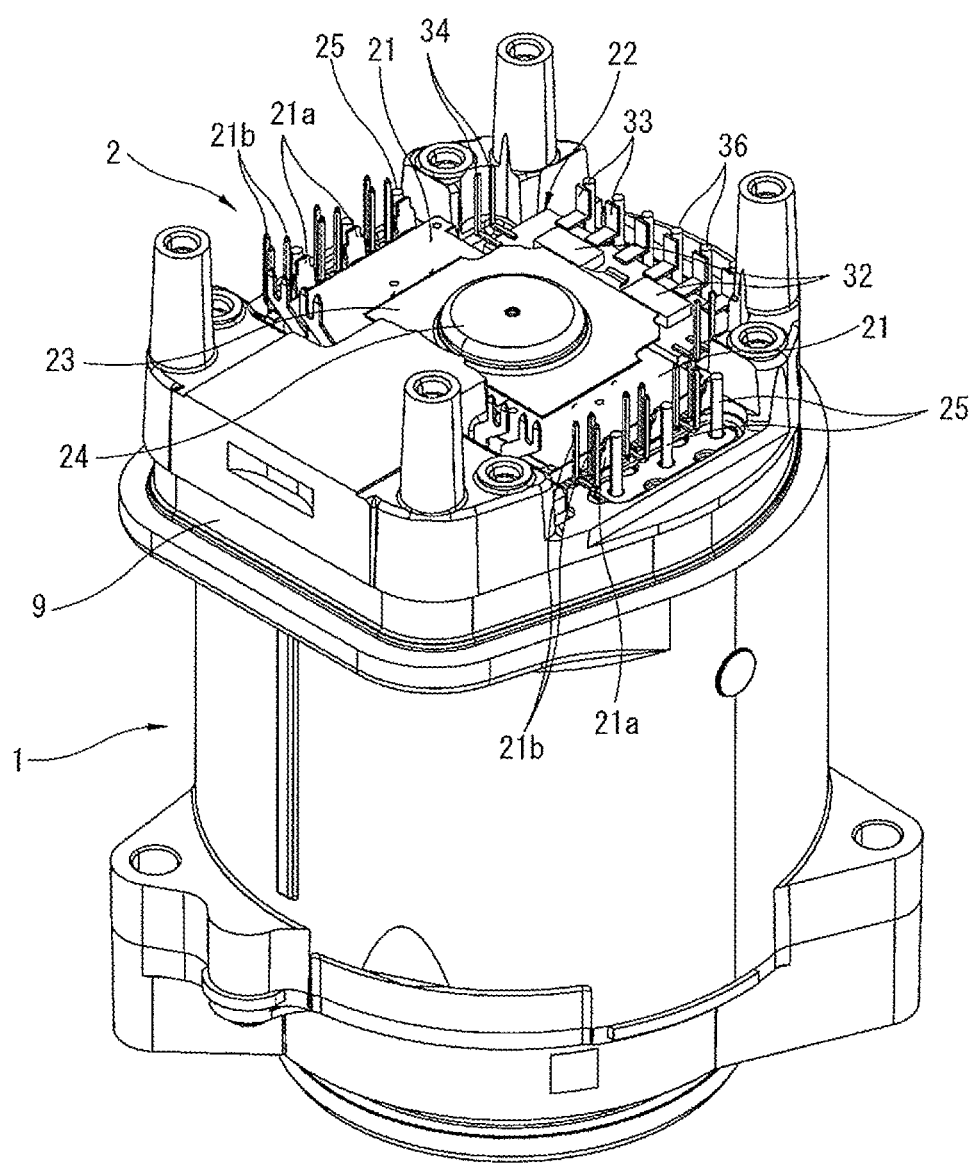
FIG. 2 is a perspective view of the electric actuator device having a fuse module according to a first embodiment.

FIG. 2 is a perspective view showing a configuration of the inverter/power module unit 2 with the motor cover 5, the connector member 4 and the circuit board 3 removed from the electric actuator device. As illustrated in FIG. 2, the inverter/power module unit 2 includes two inverter modules 21 corresponding to the coils of the two systems and a fuse module 22. These three modules each have an elongated rectangular shape, and are arranged so as to enclose the rotation shaft 6 with a substantially U-shaped arrangement. More specifically, the pair of inverter modules 21 are located so as to correspond to legs of the letter U with these inverter modules 21 facing each other, and the fuse module 22 is located at a position corresponding to a top of the letter U.

A surface, on the motor cover 5 side, of the bottom wall portion 9 is formed so that areas corresponding to the inverter/power module unit 2, i.e. the two inverter modules 21 and the fuse module 22, are relatively recessed. Then, the inverter modules 21 and the fuse module 22 are accommodated in these recesses. Further, in order for these inverter modules 21 and fuse module 22 to be supported on the bottom wall portion 9, a rectangular pressing member 23 made of a press-formed metal plate is arranged at a center of the motor unit 1. The pressing member 23 is attached to the bottom wall portion 9 through a bottomed cylindrical cap 24 that covers an end portion of the rotation shaft 6.

The pair of inverter modules 21 correspond to the above described two systems of the motor 1A respectively. That is, one of the inverter modules 21 supplies power to the coils of the first system, and the other of the inverter modules 21 supplies power to the coils of the second system. Each inverter module 21 is configured as one module in which a plurality of switching elements, which form upper and lower arms for U-phase, V-phase and W-phase, are accommodated in a rectangular package. Each inverter module 21 has three main terminals 21a connected to one ends of the coils of the respective phases and a plurality of control terminals 21b. The main terminal 21a is welded to a terminal portion 25 which is one end of the coil and protrudes from the bottom wall portion 9. Each control terminal 21b is connected to the circuit board 3. It is noted that the inverter module 21 is fixed by welding the main terminals 21a to the respective terminal portions 25.

Figure 3:
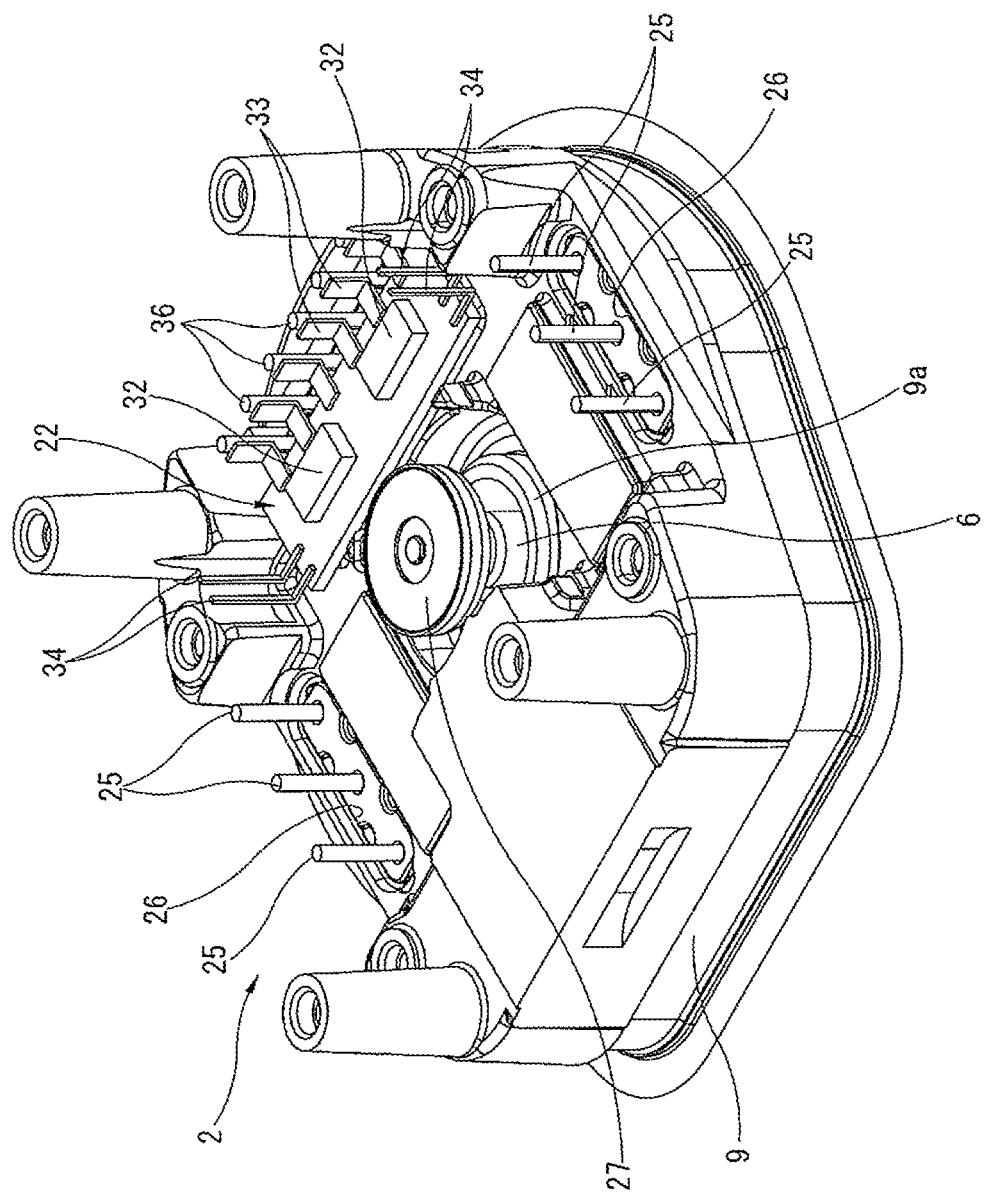
FIG. 3 is a perspective view of the electric actuator device depicted with a pressing member and inverter modules being removed.

FIG. 3 is a drawing showing the configuration with the inverter modules 21, the pressing member 23 and the cap 24 removed from the configuration of FIG. 2. As shown in FIG. 3, for each of the first system and the second system of the motor 1A, the terminal portions 25 of the one ends of the coils of U-phase, V-phase and W-phase are arranged in a row (or in line). The three terminal portions 25 of each system penetrate the bottom wall portion 9 through an opening 26 provided at the bottom wall portion 9. Further, as illustrated in FIG. 3, a disk-shaped detected portion 27 having a permanent magnet corresponding to a rotation sensor (not shown) provided at the circuit board 3 side is attached to the end portion of the rotation shaft 6. The cap 24 is attached to a cylindrical portion 9a of the bottom wall portion 9 so as to cover this detected portion 27.

Figure 4:
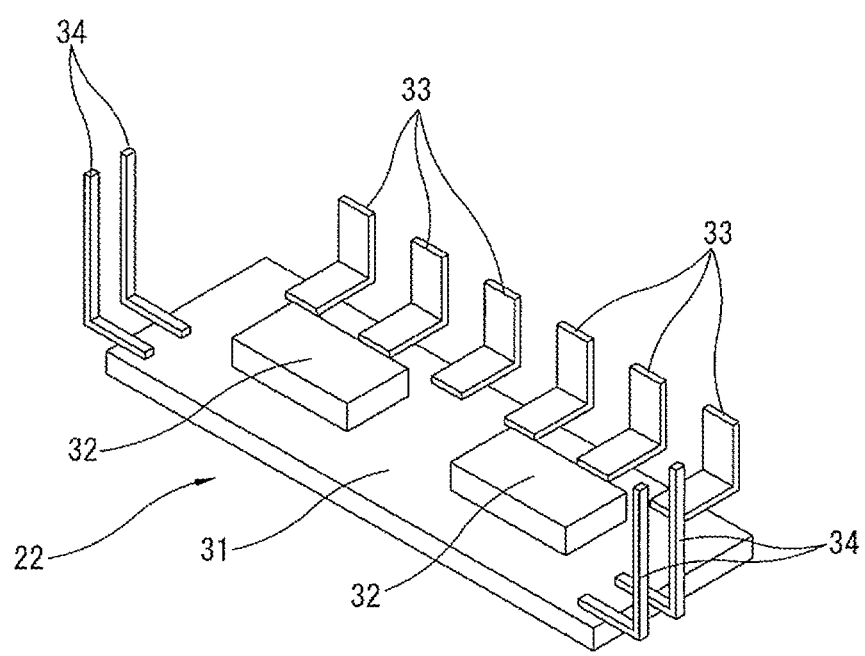
FIG. 4 is a perspective view of the fuse module of the first embodiment.

FIG. 4 illustrates the fuse module 22 of the first embodiment as a single component. This fuse module 22 has a rectangular fuse circuit board 31 made of a printed wiring board such as a glass epoxy board, a pair of fuse circuit elements 32 mounted on a surface of the fuse circuit board 31, six main terminals 33 arranged at one long side of the fuse circuit board 31 and four control terminals 34, two pairs of which are provided at respective end portions located in a longitudinal direction of the fuse circuit board 31. The fuse circuit elements 32 each have a flat rectangular package, and these two fuse circuit elements 32 are aligned with each other in the longitudinal direction of the fuse circuit board 31.

These two fuse circuit elements 32 correspond to the two systems of the motor 1A respectively. That is, one of the fuse circuit elements 32 corresponds to each phase of U, V and W of the first system, and the other of the fuse circuit elements 32 corresponds to each phase of U, V and W of the second system. Each three of the six main terminals 33 correspond to each fuse circuit element 32. Similarly, the pair of control terminals 34 located at one end portion of the fuse circuit board 31 corresponds to the one fuse circuit element 32, and the other pair of control terminals 34 located at the other end portion of the fuse circuit board 31 corresponds to the other fuse circuit element 32.

As depicted in FIG. 3, the main terminals 33 of the fuse module 22 are welded to terminal portions 36 of the other ends of the coils which protrude from the bottom wall portion 9 respectively. The control terminals 34 are connected to the aforementioned circuit board 3. The fuse module 22 is fixed by welding the main terminals 33 to the respective terminal portions 36.

The six terminal portions 36 are arranged in a row (or in line) on the bottom wall portion 9. In the same manner as the above described terminal portions 25 of the inverter modules 21, these terminal portions 36 penetrate the bottom wall portion 9 through an opening 26 of the bottom wall portion 9. Three of the six terminal portions 36 correspond to the coils of U-phase, V-phase and W-phase of the first system, and the remaining three correspond to the coils of U-phase, V-phase and W-phase of the second system.

Figure 5:
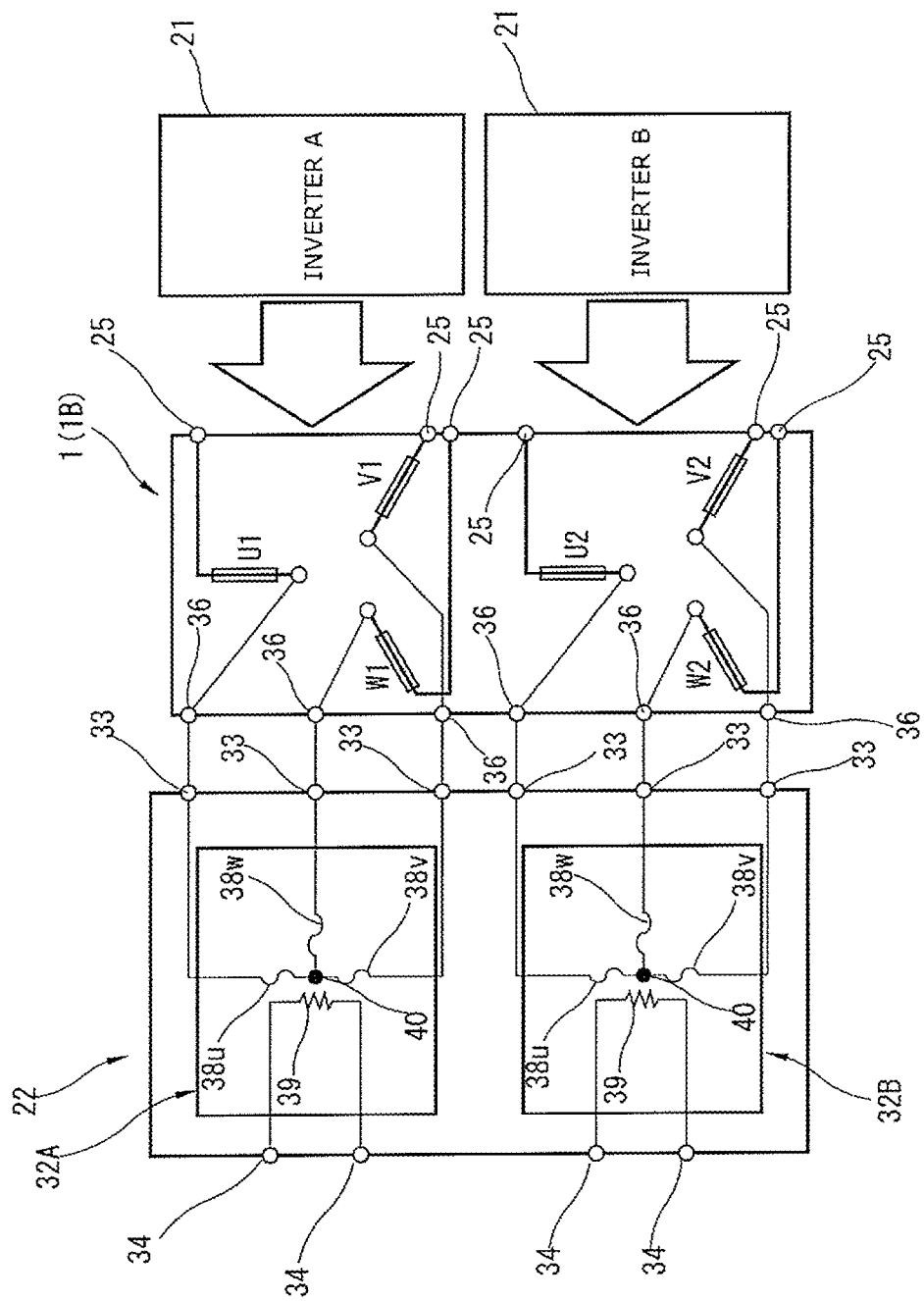
FIG. 5 is a circuit diagram showing a configuration of a fuse circuit.

FIG. 5 is a circuit diagram showing a fuse circuit configured by the fuse module 22 together with circuit configurations of the inverter modules 21 and the motor 1A. As illustrated in FIG. 5, the motor 1A has coils U1, V1 and W1 of the three phases which form the first system and coils U2, V2 and W2 of the three phases which form the second system. One ends of the coils U1, V1 and W1 of the first system are formed as the respective terminal portions 25, and connected to output terminals (the main terminals 21a of the inverter module 21) of an inverter circuit (denoted as an "inverter A" in the drawing) configured by the one inverter module 21 respectively. Likewise, one ends of the coils U2, V2 and W2 of the second system are formed as the respective terminal portions 25, and connected to output terminals (the main terminals 21a of the inverter module 21) of an inverter circuit (denoted as an "inverter B" in the drawing) configured by the other inverter module 21 respectively.

The other ends of the coils U1, V1 and W1 of the first system are formed as the respective terminal portions 36, and connected to the three main terminals 33 of the fuse module 22 respectively. These three main terminals 33 correspond to the first fuse circuit element 32 (denoted by a reference sign 32A). The first fuse circuit element 32 (32A) has fuses 38 (38u, 38v and 38w) provided in phase circuits (or phase lines) of the phases U, V and W respectively and a heater 39 for blowing out these fuses 38. These three fuses 38 and the heater 39 are sealed or enclosed in a package. Here, the phase lines of the phases U, V and W, having the respective fuses 38, are connected together at a neutral point 40 inside the first fuse circuit element 32 (32A).

That is, the phase lines of the phases of U, V and W including the coils U1, V1 and W1 of the first system are connected as so-called Y-connection at the neutral point 40 inside the first fuse circuit element 32 (32A). Then, the fuses 38 (38u, 38v and 38w) are positioned in the respective phase lines between the respective coils U1, V1 and W1 and the neutral point 40.

The heater 39 is connected to the pair of control terminals 34 that are adjacent to the first fuse circuit element 32 (32A). When it is necessary to cut off the phase line for fail-safe due to some abnormality, a predetermined power is supplied to the heater 39 as a cut-off signal from a control circuit configured by the circuit board 3, and the fuse 38 is blown out by heat generated by the heater 39.

The second system is also configured in the same manner as the first system. The other ends of the coils U2, V2 and W2 of the second system are formed as the respective terminal portions 36, and connected to the three main terminals 33 of the fuse module 22 respectively. These three main terminals 33 correspond to the second fuse circuit element 32 (denoted by a reference sign 32B). The second fuse circuit element 32 (32B) has fuses 38 (38u, 38v and 38w) provided in phase circuits (or phase lines) of the phases U, V and W respectively and a heater 39 for blowing out these fuses 38. These three fuses 38 and the heater 39 are sealed or enclosed in a package. The phase lines of the phases U, V and W, having the respective fuses 38, are connected together at a neutral point 40 inside the second fuse circuit element 32 (32B).

That is, the phase lines of the phases of U, V and W including the coils U2, V2 and W2 of the second system are connected as so-called Y-connection at the neutral point 40 inside the second fuse circuit element 32 (32B). Then, the fuses 38 (38u, 38v and 38w) are positioned in the respective phase lines between the respective coils U2, V2 and W2 and the neutral point 40.

The heater 39 is connected to the pair of control terminals 34 that are adjacent to the second fuse circuit element 32 (32B). When it is necessary to cut off the phase line for fail-safe due to some abnormality, a predetermined power is supplied to the heater 39 as a cut-off signal from a control circuit configured by the circuit board 3, and the fuse 38 is blown out by heat generated by the heater 39.

Therefore, as is clear from FIG. 5, only either one of the first and second systems can be cut off according to conditions, or both of the first and second systems can be cut off according to conditions. It is noted that the motor 1A can drive the electric power steering device by only either one of the first and second systems.

As describe above, in the embodiment, instead of the conventional neutral point relay configured by the switching element provided in each phase line for fail-safe, the fuse circuit is used. Therefore, this can achieve reduction in parts cost and also improve efficiency in motor drive by lowering of a resistance of the phase line.

Further, since the fuse circuit is packaged as the fuse circuit element 32 including the fuses 38, the heater 39 and the neutral point 40, its configuration can be simplified. Furthermore, since the heater 39 is accommodated in the same package, it is possible to cut off the phase line with reliable and stable characteristics.

In addition, in the above embodiment, since the fuse circuit is formed as the fuse module 22 having the fuse circuit board 31 which is provided separately from the circuit board 3, mounting of the fuse circuit (the fuse module 22) in the case (the enclosure) of the electric actuator device can be facilitated. Further, the fuse circuit (the fuse module 22) can be arranged separately from or independently of the circuit board 3 having a number of heat-producing components, thereby reducing a thermal influence from the circuit board 3.

Next, structures to suppress an external thermal influence on the fuse module 22 accommodating therein the fuses 38 will be described with reference to FIGS. 6 to 8. As described above, since the fuse 38 is blown out by heat generated by the heater 39, for instance, if heat of the heater 39 escapes to the outside, conversely, if heat is applied to the fuse 38 from the outside, there is a concern that cut-off characteristics will be affected. Therefore, it is preferable that the fuse circuit element 32 be thermally insulated from the outside as much as possible.

Figure 6:
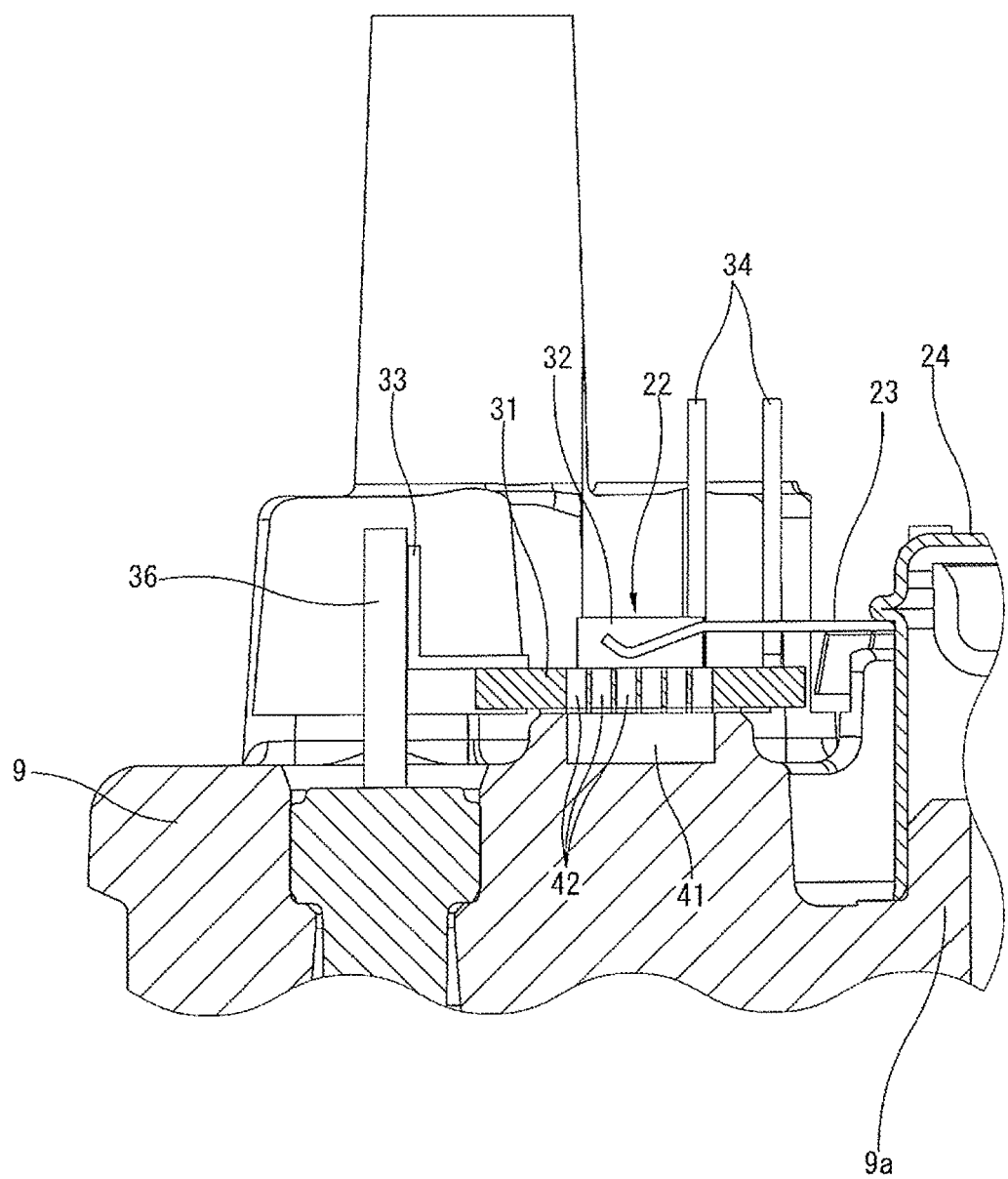
FIG. 6 is a sectional view of a main part, showing an example of a thermal insulation structure.

In an example shown in FIG. 6, an upper surface side of the fuse circuit element 32 exposed on the fuse circuit board 31 is separate from other surrounding members and is open. Further, a recessed portion 41 is formed on the bottom wall portion 9 so as to face a back surface side of the fuse circuit board 31 where the fuse circuit element 32 is located. A space that serves as a heat insulating layer (a thermal break or a thermal barrier) for the fuse circuit element 32 is then provided by the forming of this recessed portion 41. Both surfaces of the fuse circuit element 32 are thermally insulated from the surrounding members in this manner, thereby reducing the external thermal influence.

Further, in this example, in order to suppress exchange of heat through the fuse circuit board 31, at least one penetration hole 42 is formed at the fuse circuit board 31 in an area where the fuse circuit element 32 is located.

Figure 7:
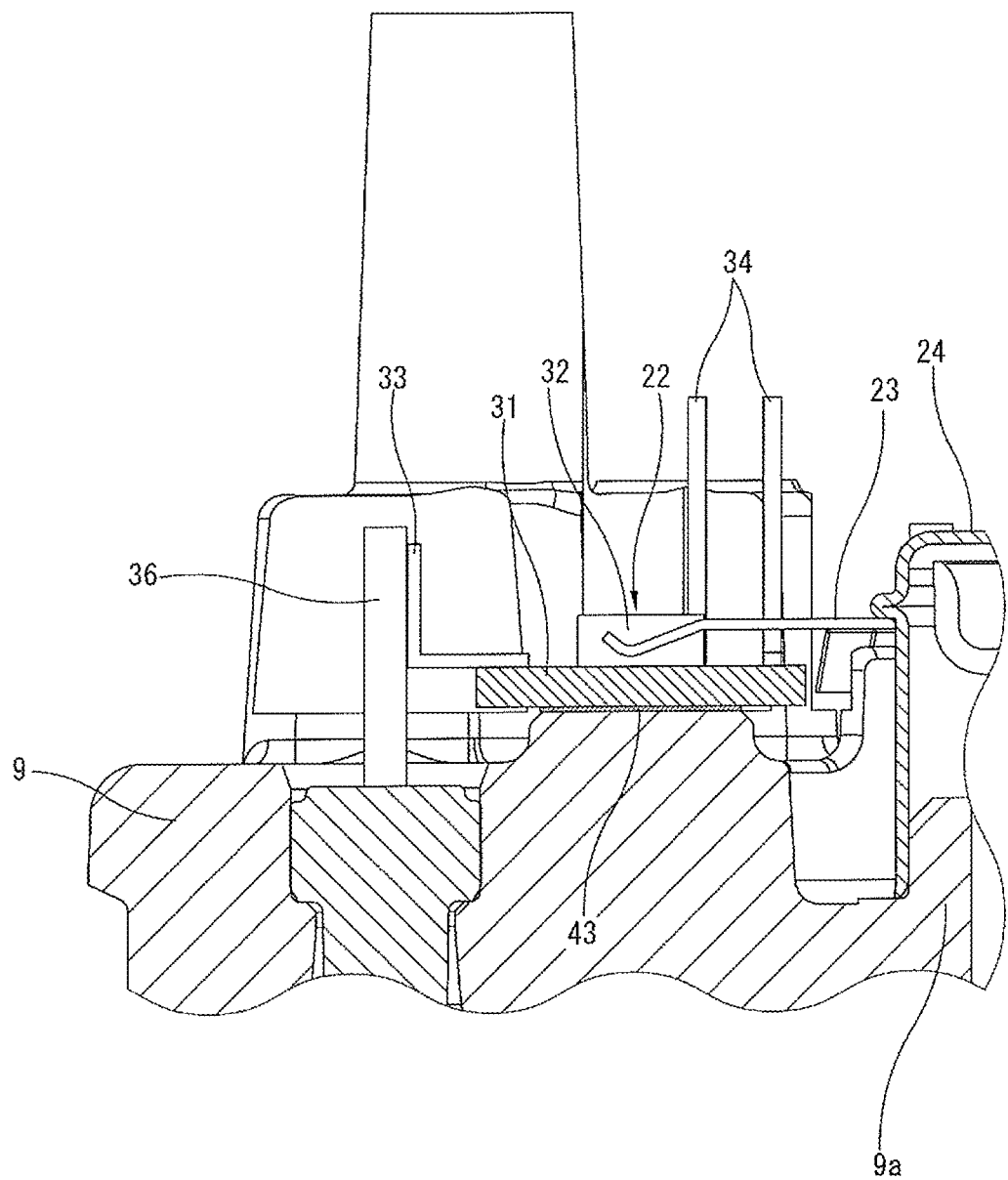
FIG. 7 is a sectional view of a main part, showing another example of the thermal insulation structure.

In an example shown in FIG. 7, a sheet-like heat shield member 43 is provided between the fuse circuit board 31 and a surface of the bottom wall portion 9. As the heat shield member 43, for instance, a urethane sheet, a polyester sheet, a silicon material sheet, a gel heat insulating material etc. can be used.

Figure 8:
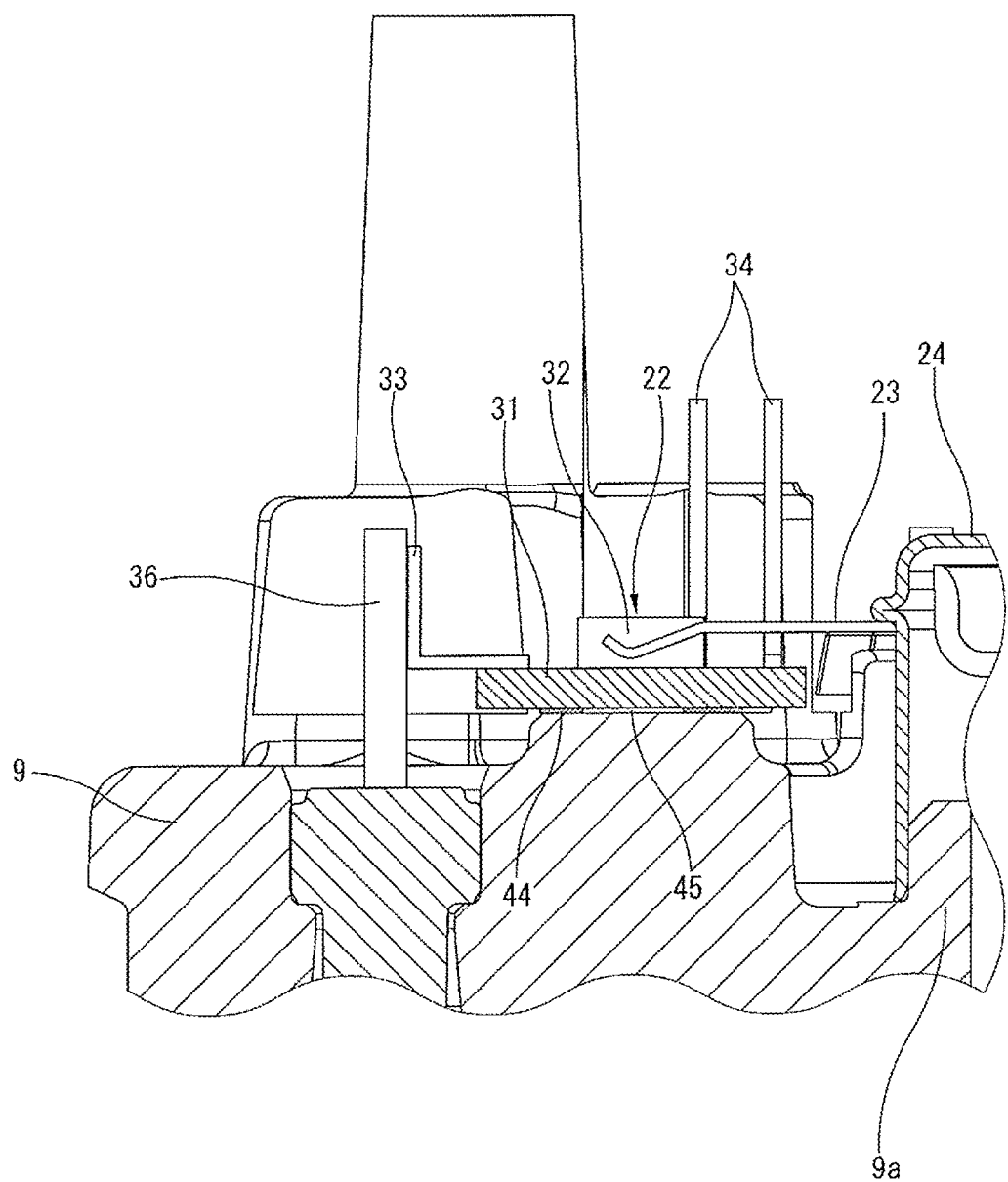
FIG. 8 is a sectional view of a main part, showing the other example of the thermal insulation structure.

In an example shown in FIG. 8, a sheet-like heat shield member 44 is provided between the fuse circuit board 31 and the surface of the bottom wall portion 9, and this heat shield member 44 has an opening 45 in the middle of the heat shield member 44. An air layer is then formed between the fuse circuit board 31 and the bottom wall portion 9 by this opening 45.

Figure 9:
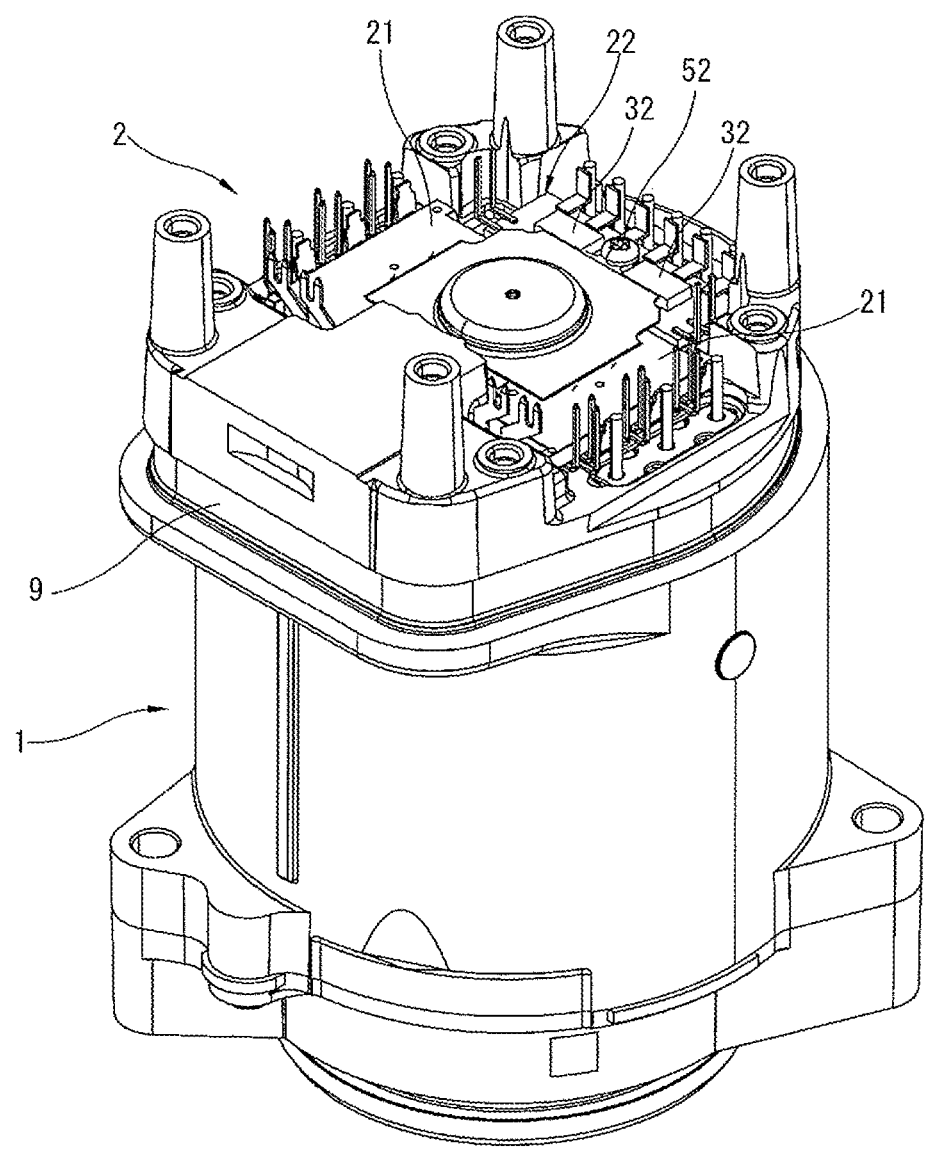
FIG. 9 is a perspective view of an electric actuator device having a fuse module according to a second embodiment.
Figure 10:
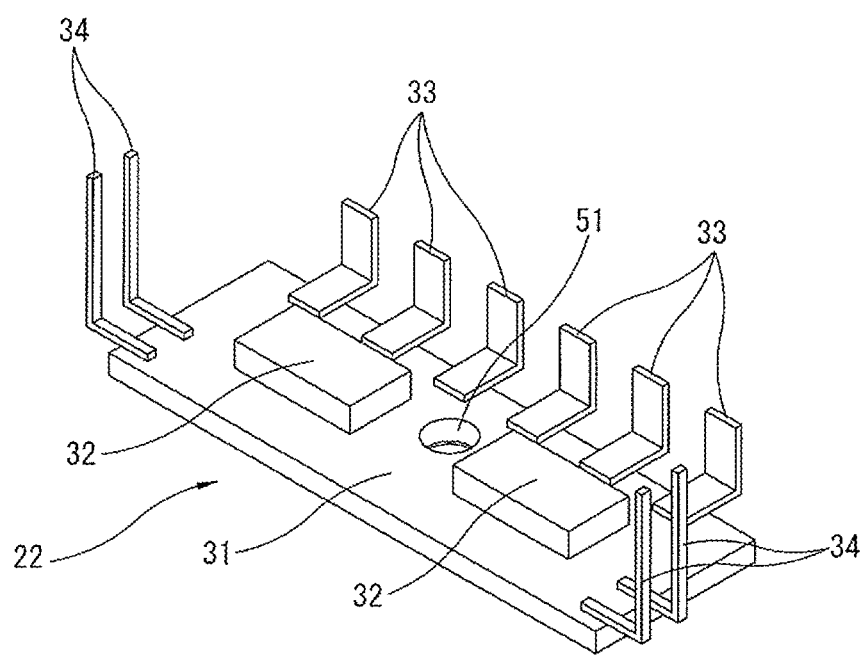
FIG. 10 is a perspective view of the fuse module of the second embodiment.

Next, a second embodiment of the fuse module 22 will be described with reference to FIGS. 9 and 10. FIG. 9 is a perspective view of the electric actuator device having the fuse module 22 of the second embodiment. FIG. 10 is a perspective view showing the fuse module 22 of the second embodiment as a single component.

In this second embodiment, a penetration hole 51 is formed in the middle of the fuse circuit board 31 (i.e. between the two fuse circuit elements 32), and the fuse module 22 is fixed to the bottom wall portion 9 with a screw 52 that is inserted into the penetration hole 51. Therefore, the fuse module 22 can be supported more firmly.

Figure 11:
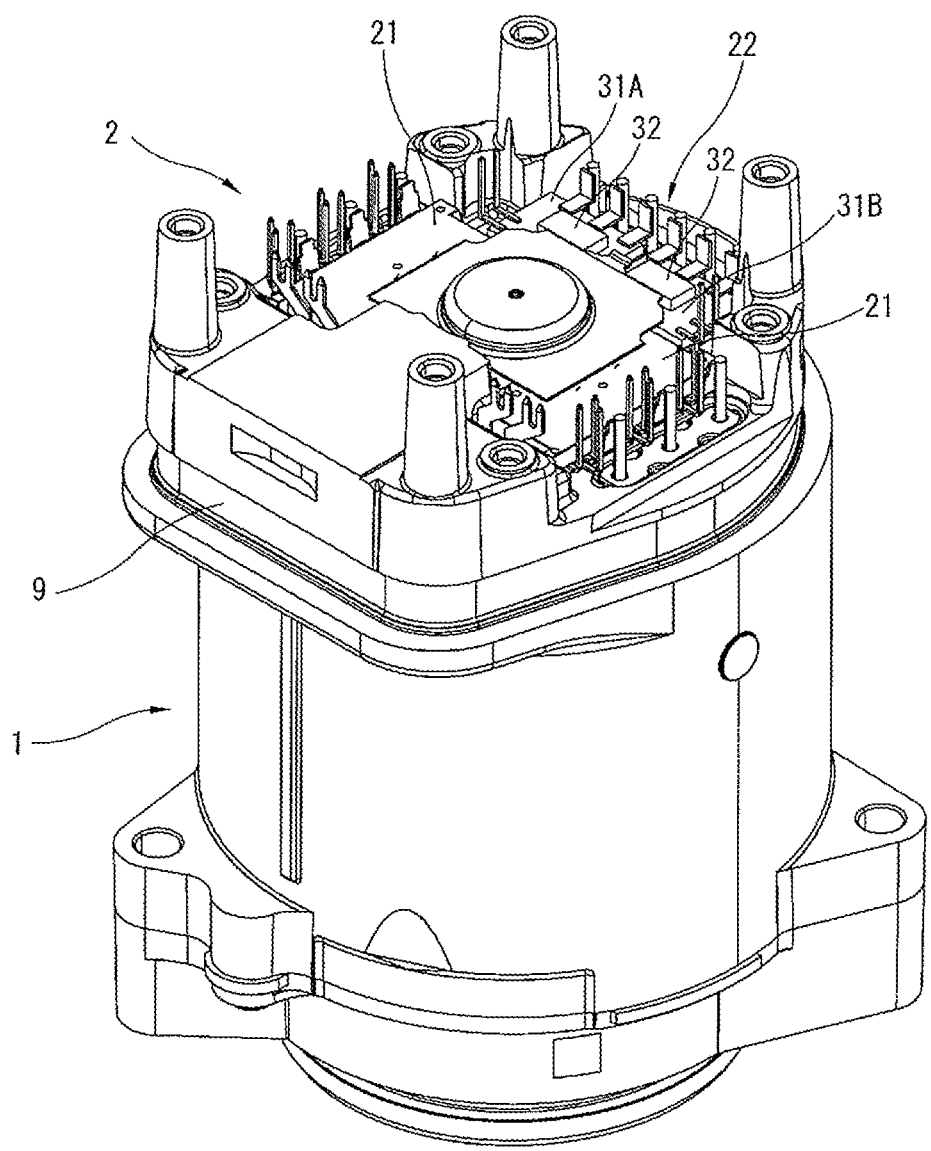
FIG. 11 is a perspective view of an electric actuator device having a fuse module according to a third embodiment.
Figure 12:
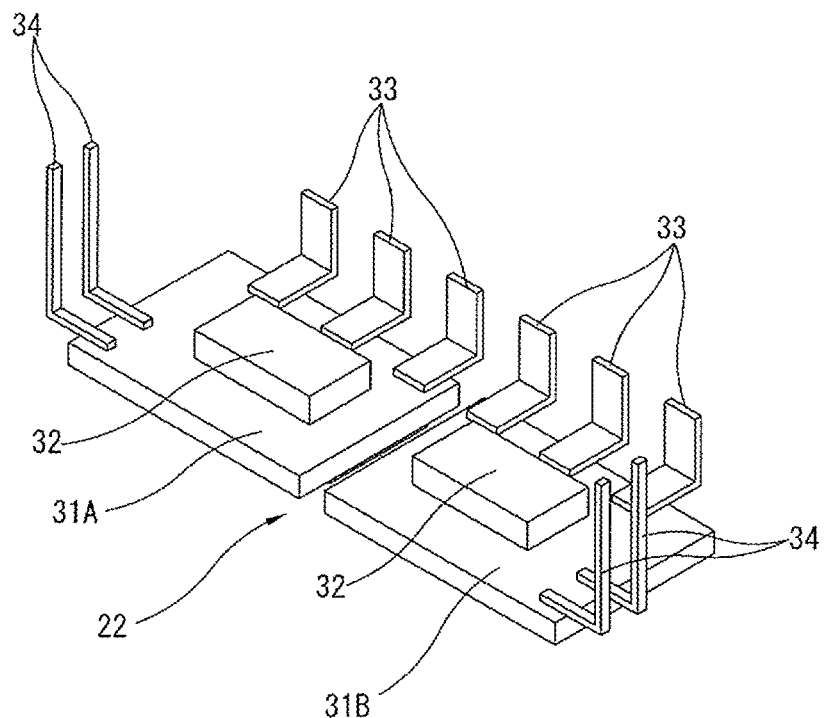
FIG. 12 is a perspective view of the fuse module of the third embodiment.

Next, a third embodiment of the fuse module 22 will be described with reference to FIGS. 11 and 12. FIG. 11 is a perspective view of the electric actuator device having the fuse module 22 of the third embodiment. FIG. 12 is a perspective view showing the fuse module 22 of the third embodiment as a single component.

In this third embodiment, the fuse circuit board 31 is divided into two fuse circuit boards 31A and 31B corresponding to the pair of fuse circuit elements 32. The fuse circuit board 31A corresponds to each phase of U, V and W of the first system, and the fuse circuit board 31B corresponds to each phase of U, V and W of the second system.

Such configuration in which the fuse module 22 is divided into two components has the advantage that the two fuse circuit elements 32 are less susceptible to thermal influences on each other. For instance, when the heater 39 of one fuse circuit element 32 is energized, heat transfer (or heat conduction) from this heater 39 to the other fuse circuit element 32 is suppressed.

Although the embodiments of the present invention are described in detail above, the present invention is not limited to the above embodiments, but includes various modifications. For instance, in the above embodiments, the two fuse circuits of the two systems are provided for the two stator coils of the two systems. However, if the electric motor is a motor having only one stator coil of one system, one fuse circuit of the one system is possible. Further, the specific configuration and the arrangement etc. of the fuse circuit are not limited to the above embodiments.

Further, the present invention is not limited to the above motor drive device of the electric actuator device for the power steering device, but can be applied to various kinds of electric motors.

As described above, in the present invention, a motor drive device which is structured integrally with an electric motor having a coil for each phase and drives and controls the electric motor, and which is configured so that a phase line of each phase including the coil for each phase is connected at a neutral point, the motor drive device comprising: a fuse circuit arranged between the coil of the phase line and the neutral point and configured to be able to cut off power supplied to the neutral point in response to a cut-off signal from a control circuit.

As a preferable motor drive device, the fuse circuit is mounted on a fuse circuit board that is independent of a control circuit board mounting thereon the control circuit.

For instance, the fuse circuit is accommodated, as a fuse circuit element including a plurality of fuses corresponding to a plurality of phase lines and a heater blowing out the fuses, in a package, and the fuse circuit element is mounted on the fuse circuit board.

As a far preferable motor drive device, an upper surface side of the fuse circuit element exposed on the fuse circuit board and a back surface side of the fuse circuit board where the fuse circuit element is located are arranged with spaces formed between the upper surface side of the fuse circuit element and a surrounding member and between the back surface side of the fuse circuit board and another surrounding member respectively in an enclosure.

Further, at least one penetration hole is formed at the fuse circuit board in an area where the fuse circuit element is located.

Furthermore, a heat shield member is provided between a member to which the fuse circuit board is attached and the fuse circuit board.

The invention claimed is:

1. A motor drive device which is structured integrally with an electric motor having a coil for each phase and drives and controls the electric motor, and which is configured so that a phase line of each phase including the coil for each phase is connected at a neutral point, the motor drive device comprising:
   a fuse circuit arranged between the coil of the phase line and the neutral point and configured to be able to cut off power supplied to the neutral point in response to a cut-off signal from a control circuit, wherein the fuse circuit is mounted on a fuse circuit board that is independent of a control circuit board mounting thereon the control circuit.

2. The motor drive device as claimed in claim 1, wherein the fuse circuit is accommodated, as a fuse circuit element including a plurality of fuses corresponding to a plurality of phase lines and a heater blowing out the fuses, in a package, and
   the fuse circuit element is mounted on the fuse circuit board.

3. The motor drive device as claimed in claim 2, wherein an upper surface side of the fuse circuit element exposed on the fuse circuit board and a back surface side of the fuse circuit board where the fuse circuit element is located are arranged with spaces formed between the upper surface side of the fuse circuit element and a surrounding member and between the back surface side of the fuse circuit board and another surrounding member respectively in an enclosure.

4. The motor drive device as claimed in claim 3, wherein at least one penetration hole is formed at the fuse circuit board in an area where the fuse circuit element is located.

5. The motor drive device as claimed in claim 2, wherein a heat shield member is provided between a member to which the fuse circuit board is attached and the fuse circuit board.

* * * * *